Patented Oct. 20, 1953

2,656,330

UNITED STATES PATENT OFFICE 2,656,330

SUSPENSIONS OF POLYMERIC CHLOROTRIFLUOROETHYLENE

Murray M. Sprung, Schenectady, N. Y., assignor to General Electric Company, a corporation of New York No Drawing. Original application November 25, 1949, Serial No. 129,532. Divided and this application January 16, 1953, Serial No. 331,729

14 Claims. (Cl. 260—31.8)

1

This application is a division of my earlier filed application, Serial No. 129,532, filed November 25, 1949, and assigned to the same assignee as the present invention.

This invention is concerned with suspensions of polymeric chlorotrifluoroethylene. More particularly, the invention relates to a suspension comprising (1) a dispersed phase of finely divided polymeric chlorotrifluoroethylene and (2) a dispersing medium comprising (a) an organic liquid or mixture of organic liquids which, at elevated temperatures but below their boiling points, are solvents for the aforementioned polymer and (b) a liquid diluent which is a non-solvent for the polymer at any temperature and which is an oxygen-containing compound having a boiling point above 50° C. and selected from the class consisting of saturated aliphatic ethers (both straight-chained and cyclic), saturated aliphatic monohydric alcohols (including halogenated, e. g., chlorinated alcohols), aliphatic ketones, aliphatic esters, aliphatic lactones, aliphatic acetals, mixtures of monohydric saturated aliphatic alcohols and dihydric saturated aliphatic alcohols, and mixtures of all the foregoing oxygen-containing compounds. The invention also embraces methods for making the above-described suspensions.

Solid, high molecular weight, polymeric chlorotrifluoroethylene has been found to have good heat resistance and chemical resistance and because of this is eminently suitable for many applications where such properties are desired. Electrical conductors insulated with polymeric chlorotrifluoroethylene are capable of withstanding temperatures of the order of from about 150° to 200° C. for long period of time with little change in the physical characteristics or of the insulating properties of the polymeric insulation. Such polymeric material is also highly desired for many applications where its high softening point is an advantage. Thus, it is possible to mold various objects from the polymeric chlorotrifluoroethylene, either with or without fillers to give useful articles which are dimensionally stable over a wide temperature range.

2

Because of its extreme chemical resistance and substantial insolubility in many of the common organic solvents, great difficulty has been experienced in obtaining the polymeric chlorotrifluoroethylene in usable form whereby it can be employed for coating or impregnating applications. Many attempts have been made to form solutions of the polymeric chlorotrifluoroethylene, but these attempts have generally been unsuccessful because the limit of solubility of the polymeric chlorotrifluoroethylene in the solvent has been so small as to render it impractical. Attempts to prepare suspensions of polymeric chlorotrifluoroethylene have also been generally unsuccessful because of the poor stability of such suspensions in the dispersing mediums employed heretofore with polymeric chlorotrifluoroethylene.

I have now discovered for the first time that it is possible to make relatively stable suspensions of polymeric chloroetrifluoroethylene (any solid polymer thereof may be employed) using as the suspending medium a mixture of liquide described above in the first paragraph of this application. This is done by first grinding the polymeric material, for instance, in a micro-pulverizer, to a fine particle size and thereafter mixing the finely divided polymer with a dispersing phase comprising a mixture of ingredients comprising (a) an organic liquid which is a solvent for the polymer at an elevated temperature but below the boiling point of the liquid and (b) an oxygen-containing compound selected from the class described previously, and finally grinding this mixture, for example, in a pebble mill or a ball mill for a time sufficient to yield a stable, uniform suspension.

Suspensions made in accordance with my above-described method are uniformly stable over long periods of time. I am able to prepare by my method smooth, creamy suspensions which can be obtained in two to three days' grinding time in standard ball mills and which are more uniform, less granular, less thixotropic, and have slower settling rates than those obtained from many other types of organic liquids. If there should be some slight settling out of the suspended polymeric material, it is possible by mere stirring, either before use or during use, to reinstate the suspension to its former acceptable state. Although some dispersions of similar polymers, e. g., polymeric tetrafluoroethylene, have been made using other materials as a dispersing phase, nevertheless, attempts to use these particular dispersing media with polymeric chlorotrifluoroethylene have been generally unsuccessful.

Generally, the procedure followed for making my suspensions comprises pulverizing or grinding polymeric chlorotrifluoroethylene to a fine particle size of the order of about 0.2 to 25 microns, preferably 0.5 to 15 microns. This may be accomplished by grinding the polymer in a micro-pulverizer used for such purposes. Thereafter, the finely ground polymer and the mixture of liquids comprising the dispersing phase are mixed together and again ground, this time, for instance, in either a ball mill or a pebble mill. The ratio, by weight, of dispersing phase and finely divided polymer may be carried within wide limits depending upon the desired concentration of the final suspension. Thus, I may advantageously employ, by weight, from 0.01 to 1 or more parts of the polymer per part of the liquid dispersing phase. A range which I have found useful comprises, by weight, from about 0.05 to 0.3 part polymer per part of the liquid dispersing phase. On a percentage basis, good results may be realized when the polymer comprises about 10 to 30 per cent, by weight, of the total weight of polymer and the dispersing phase.

From the foregoing general description it will be apparent that my invention employs both an active solvent and a relatively inexpensive, non-solvent, diluent, thus permitting a considerable saving in money. The use of a dispersing phase comprising a mixture of ingredients wherein one of the ingredients is a solvent for the polymer at elevated temperatures, has several advantages. In the first place, by using a relatively volatile non-solvent diluent in the dispersing phase, this diluent flashes off first during the baking cycle when the coated object is passed through a baking oven at elevated temperatures to effect fusion or coalescence of the individual particle of polymeric chlorotrifluoroethylene deposited on the surface. The active solvent or solvents remaining in the dispersing phase are then able to dissolve or partially dissolve or to plasticize or swell the uniformly deposited, finely divided particles of solid, polymeric chlorotrifluoroethylene. Sintering or fusion, therefore, of the individual polymeric particles occurs at temperatures lower than are normally required for the pure polymer. After fusion, the active solvents are preferably completely removed by further heating. The active (i. e., solvents in which the polymer is soluble at elevated temperatures) higher boiling solvents can be recovered by means of a suitable recovery system and retained for use in making additional suspensions.

The proportion of active solvent in the dispersing phase may, of course, be varied within wide limits. However, for economical reasons I have found it practical to use a minor proportion (e. g., from 5 to 49 per cent, by weight, for instance from 10 to 40 per cent, based on the total weight of the dispersing phase) of such liquids and a major proportion (e. g., from 51 to 95 per cent, by weight) of the liquid non-solvent (i. e., for the polymeric chlorotrifluoroethylene) diluent. Variations within these ranges, e. g., from 5 to 90 per cent of the active solvent and from 10 to 95 per cent of the nonsolvent diluent, may be employed without departing from the scope of the invention.

The number of liquid active solvents or mixture of such materials which I have found can be employed in the practice of this invention are relatively few. Among these may be mentioned, for example, certain individual alkylated, preferably liquid, aromatic hydrocarbons, for instance, pseudocumene, mesitylene, t-butylbenzene, beta-methylnaphthalene, para-t-butyltoluene, alpha, beta-dimethylnaphthalene, amylbiphenyl, alpha-methyl, para-methylstyrene, paracymene, distyrene (styrene dimer), diamylbiphenyl, para-di-t-butylbenzene, etc.; certain high boiling organic esters, for instance, dibutyl phthalate, dibutyl sebacate, butyl stearate, dibutyl adipate, dioctyl sebacate, methyl stearate, tributyl citrate, tributyl tricarballylate, acetyl tributyl citrate, dihexyl tetrachlorophthalate, dioctyl tetrachlorophthalate (including its isomers, e. g., di-(2-ethylhexyl)-tetrachlorophthalate), triethylene glycol di-(2-ethylhexoate), beta-naphthyl benzoate, and mixtures thereof, etc.; fluorinated organic compounds having a boiling point above 110° C. and selected from the class consisting of (a) nuclearly fluorinated aromatic hydrocarbons containing two aromatic nuclei free of other substituents, (b) halogenated (e. g., chlorinated, brominated, etc.) derivatives of lower alkayl-substituted (e. g., methyl, ethyl, propyl, isopropyl and butyl) aromatic hydrocarbons containing fluorine (e. g., from 1 to 6 or more fluorines) in the alkyl substituent, (c) fluorinated-chlorinated aliphatic hydrocarbons of the $C_3$ and $C_4$ series containing at least two chlorine atoms (e. g., from 2 to 6), (d) liquid low molecular weight polymers of chlorotrifluoroethylene (known as "Fluorolubes") having the recurring structural unit $(CF_2-CFCl)_n$ where $n$ is an integer equal to from 4 to 16, inclusive, etc. Mixtures of the foregoing materials may also be employed as will be apparent to those skilled in the art.

Additional examples of many of the active solvents which may be employed in the practice of my invention may be found in my copending application Serial No. 129,531 and in the joint copending applications of Frederick O. Guenther and myself, Serial Nos. 129,533 and 129,534, all filed November 25, 1949, and assigned to the same assignee as the present invention.

In order that those skilled in the art may better understand how the present invention may be practiced, the following examples are given by way of illustration and not by way of limitation. All parts are by weight.

*Example 1*

In this example polymeric cholorotrifluoroethylene (of different no strength temperatures) in a finely divided form wherein the average particle size was from about 0.5 to 5 microns was mixed with a liquid dispersing medium comprising a mixture of organic liquids of which a major proportion were non-solvents for the polymer and a minor proportion were solvents for the polymer at elevated temperatures. The following table shows the ingredients employed in making the suspensions, as well as the proportions of ingredients, and the time the mixture of ingredients was milled to obtain the suspensions.

2,656,330

TABLE I

| Suspension No. | Weight Polymer, Parts | Dispersing Phase | Weight of Dispersing Phase Components, Parts | Milling Time, Days |
|---|---|---|---|---|
| 1 | 175 | Fluorolube [d] <br> alpha-Fluoronaphthalene <br> n-Butanol | 98 <br> 147 <br> 580 | 3 |
| 2 | 175 | Fluorolube <br> alpha-Fluoronaphthalene <br> n-Butanol | 140 <br> 210 <br> 475 | 4.7 |
| 3 | 175 | Fluorolube <br> alpha-Chloronaphthalene <br> n-Butanol | 98 <br> 147 <br> 580 | 3 |
| 4 | 175 | Fluorolube <br> Mesitylene <br> n-Butanol | 98 <br> 147 <br> 580 | 3 |
| 5 | 175 | Fluorolube <br> Solvesso 150 <br> n-Butanol | 98 <br> 147 <br> 580 | 3 |
| 6 | [a] 175 | Fluorolube <br> alpha-Fluoronaphthalene <br> n-Butanol | 98 <br> 147 <br> 580 | 5 |
| 7 | [a] 165 | Fluorolube <br> alpha-Fluoronaphthalene <br> n-Butanol | 132 <br> 199 <br> 504 | 5.7 |
| 8 | [a] 180 | Fluorolube <br> alpha-Fluoronaphthalene <br> n-Butanol | 140 <br> 205 <br> 475 | 10 |
| 9 | [a] 175 | Fluorolube <br> alpha-Chloronaphthalene <br> n-Butanol | 98 <br> 147 <br> 580 | 5 |
| 10 | [a] 180 | Fluorolube <br> alpha-Chloronaphthalene <br> n-Butanol | 131 <br> 197 <br> 492 | 6.7 |
| 11 | [a] 175 | Fluorolube <br> Mesitylene <br> n-Butanol | 98 <br> 147 <br> 580 | 5 |
| 12 | [a] 160 | Fluorolube <br> Hexachlorobutadiene <br> n-Butanol | 90 <br> 135 <br> 615 | 5 |
| 13 | [a] 165 | Fluorolube <br> alpha-Fluoronaphthalene <br> n-Hexanol | 132 <br> 199 <br> 504 | 4 |
| 14 | [a] 165 | Fluorolube <br> alpha-Fluoronaphthalene <br> 2-Ethylhexanol | 132 <br> 199 <br> 504 | 4 |
| 15 | [b] 165 | Fluorolube <br> alpha-Fluoronaphthalene <br> n-Butanol | 132 <br> 199 <br> 504 | 5.7 |
| 16 | [b] 175 | Fluorolube <br> Mesitylene <br> n-Butanol | 98 <br> 147 <br> 580 | 5 |
| 17 | [b] 150 | Fluorolube <br> t-Butyl benzene <br> n-Butanol | 100 <br> 150 <br> 600 | 4.8 |
| 18 | [c] 300 | Fluorolube <br> alpha-Fluoronaphthalene <br> n-Butanol | 111 <br> 167 <br> 422 | 3 |

The polymer employed in suspensions Nos. 1 to 5 had a no strength temperature of about 245° C.
[a] No strength temperature of about 270° C.
[b] No strength temperature of about 305° C.
[c] This polymer was more finely divided than any of the three other polymers employed above and had a no strength temperature of about 220° C.
[d] Low molecular weight polymer of chlorotrifluoroethylene and more particularly described in my copending application Serial No. 129,534.

The suspensions prepared above were all smooth, homogeneous and quite stable. In order to test the effect of using these suspensions as coatings for electrical conductors, a 32-mill copper wire containing an outside thin layer of plated cadmium was passed through each suspension and thereafter into a vertical oven (the effective heated section was about three feet in height) maintained at an air temperature of about 350° to 425° C. The speed with which the conductor was passed through the suspension and the oven varied from about thirty seconds to approximately sixty seconds per pass. Each conductor was passed through the suspension and the oven five times in order to insure a good build-up of the insulating coating. The insulated conductors were then tested for abrasion resistance (using the method disclosed in the application of Edward J. Flynn and Gerald W. Young, Serial No. 54,636, filed October 15, 1948, and assigned to the same assignee as the present invention), insulation resistance, and dielectric strength. Thermal life measure at 250° C. was of the order of 20 to 30 hours. The following table shows representative results of these tests.

TABLE II

| Suspension No. | Abrasion Resistance, Strokes | Insulation Resistance In Mercury | Dielectric Strength (kv.) | Build-Up, Mils |
|---|---|---|---|---|
| 4 | 7 | ∞ | 0.9 | 2.8 |
| 5 | 14 | ∞ | 0.6 | 2.2 |
| 6 | 12 | ∞ | 2.2 | 2.9 |
| 7 | 13 | ∞ | 2.8 | 2.8 |
| 8 | 7 | ∞ | 1.9 | 2.5 |
| 9 | 13 | ∞ | 2.4 | 2.4 |
| 10 | 26 | ∞ | 1.2 | 1.8 |
| 11 | 4 | ∞ | 1.7 | 3.5 |
| 12 | 3 | ∞ | 1.0 | 2.2 |
| 13 | 2 | ∞ | 1.6 | 2.4 |
| 15 | 22 | ∞ | 2.5 | 2.6 |
| 16 | 11 | ∞ | 1.7 | 2.2 |
| 17 | 25 | ∞ | 0.8 | 3.4 |

It will, of course, be apparent to those skilled in the art that in addition to the compositions described above, other concentrations of polymeric chlorotrifluoroethylene in the suspension may be employed without departing from the scope of the invention. The various ratios of ingredients which can be advantageously employed have been disclosed previously.

In addition to the active solvents employed above, other such materials may also be used, many examples of such solvents being more particularly disclosed in my aforementioned applications filed concurrently herewith, which by reference are made part of the disclosures in the instant application.

In addition to the known non-solvent diluents employed in the examples above, I may use other oxygen-containing compounds having a boiling point above 50° C. and selected from the class of compounds mentioned in the first paragraph of this specification. Among such compounds may be mentioned, for instance, aliphatic ethers (e. g., diisopropyl ether, di-n-butyl ether, dioxane, tetrahydrofurane, 1,2-di-n-butoxy ethane, etc.); aliphatic monohydric alcohols (e. g., isobutyl alcohol, n-amyl alcohol, isoamyl alcohol, tertiary amyl alcohol, 2-ethyl hexanol, chlorohydrin, etc.); saturated aliphatic esters (e. g., methyl acetate, ethyl acetate, ethylene glycol acetate, chloroethyl acetate, beta-methoxyethyl acetate, methyl lactate, etc.); aliphatic ketones (e. g., acetone, methyl ethyl ketone, methyl-n-propyl ketone, diacetone, etc.); aliphatic acetals (e. g., dimethyl acetal, 1,3-dioxolane, dichloromethyl formal, bis-beta-methoxyethyl formal, etc.); aliphatic lactones (e. g., gamma-butyrolactone, alpha-methyl, gamma-valerolactone, etc.); mixtures of saturated aliphatic monohydric alcohols and dihydric aliphatic alcohols (e. g., including the saturated aliphatic monohydric alcohols mentioned above mixed with, for instance, ethylene glycol, trimethylene glycol, tetramethylene glycol, 2-methyl-2,4-pentanediol, dipropylene glycol, etc.). Mixtures of any of the foregoing known solvent diluents may also be employed if desired. Many of the foregoing oxygen-containing compounds, as well as other such compounds and proportions of ingredients including the ratio of dihydric to monohydric alcohol which may be employed in the practice of the present invention, are more particularly disclosed in my application Serial No. 129,535 filed November 25, 1949, and assigned to the same assignee as the present invention.

Advantageously, the limit of the number of compounds, both non-solvent and solvent components, is dependent on the limits of miscibility of the components involved in the dispersing phase. Little difficulty has been encountered in using any of the non-solvent components with the solvent components in the dispersing phase.

In general, it is desirable to grind the pulverized solid polymer with the liquid mixture comprising the dispersing phase in a ball mill for several days. However, for purposes of successful application to magnet wire, it may not be necessary to grind for more than 24 to 72 hours, provided the original polymer has been reduced to the order of magnitude of at least 0.2 to .25 microns average particle size before grinding. No heating is necessary at any time for making the suspensions. The time required for ball-mill grinding to give a satisfactory stable suspension may range from about one-half to 15 days or more and, advantageously in the case of the examples described above, from about 1 to 10 days.

The suspensions of polymeric chlorotrifluoroethylene described above may be employed in various ways. They may be used for coating and impregnating various fillers such as, for example, glass cloth, glass batting, asbestos cloth, mica, etc. If desired, the suspensions may be advantageously employed in making molding compositions by adding to the suspension various inert inorganic fillers to obtain a homogenous mixture and thereafter removing the solvent and non-solvent (i. e., oxygen-containing) components of the dispersing phase from the mixture. Laminated products may also be prepared by coating and impregnating sheet material and superposing layers of the impregnated and coated material and pressing the total assembly under heat and pressure to obtain fusing of the polymer and to give a homogenous article. In some coating applications as, for instance, in the coating of electrical conductors, such as magnet wire, it has been found advantageous to add varying amounts, for example, from one to ten per cent, by weight, or more of a finely ground pigment or filler to the suspensions. Among such pigments and fillers which may be employed are, for example, catalpa clay, bentonite, mica dust, titanium dioxide, silica, lead silicate, lead titanate, etc.

My claimed suspensions containing active solvents are relatively easy to use, and give products having good appearance and a high degree of clarity. Films (e. g., from polymers having no strength temperatures of from 240° to 270° C.) deposited from these suspensions on glass, for example, were clear, completely fused, continuous, and strongly adherent at a maximum fusion temperature of 260° C. The suspensions being described have been found to be eminently suitable for treating terratex (bentonite-asbestos films) for increasing the strength of the latter. More particularly, the strength of terratex, which normally has a tensile strength of about 240 to 300 p. s. i. was improved to a crosswise tensile strength of 1,000 p. s. i., and a lengthwise tensile strength of 1400 p. s. i. when about 52%, by weight, polymer based on the weight of the terratex, was added by dipping the terratex in the suspension and baking in an oven.

What I claim as new and desire to secure by Letters Patent of the United States is:

1. A liquid suspension comprising a dispersed phase consisting essentially of finely divided, solid, high molecular weight polychlorotrifluoroethylene and a dispersing medium for the solid polychlorotrifluoroethylene comprising (1) an organic liquid which is a solvent for the aforesaid solid polymer at elevated temperatures but whose solvent characteristic is effective at a temperature below the boiling point of the liquid, the aforementioned liquid being selected from the class consisting of dibutyl phthalate, dibutyl sebacate, butyl stearate, dibutyl adipate, dioctyl sebacate, methyl stearate, tributyl citrate, tributyl tricarballylate, acetyl tributyl citrate, dihexyl tetrachlorophthalate, dioctyl tetrachlorophthalate, triethylene glycol di-(2-ethylhexoate), and beta-naphthyl benzoate, and (2) a non-solvent liquid oxygen-containing diluent having a boiling point above 50° C. and selected from the class consisting of saturated aliphatic ethers, saturated aliphatic monohydric alcohols, saturated aliphatic ketones, saturated aliphatic esters, mixtures of monohydric saturated aliphatic alcohols and dihydric saturated aliphatic alcohols, and mixtures of the foregoing oxygen-containing compounds.

2. A liquid suspension comprising (1) a dispersed phase consisting essentially of finely divided, solid, high molecular weight polychlorotrifluoroethylene and (2) a dispersing medium for (1) comprising (a) dibutyl phthalate and (b) a liquid saturated aliphatic monohydric alcohol boiling above 50° C.

3. A liquid suspension comprising (1) a dispersed phase consisting essentially of finely divided, solid, high molecular weight polychlorotrifluoroethylene and (2) a dispersing medium for (1) comprising (a) dibutyl phthalate and (b) a liquid saturated aliphatic ether boiling above 50° C.

4. A liquid suspension comprising (1) a dispersed phase consisting essentially of finely divided, solid, high molecular weight polychlorotrifluoroethylene and (2) a dispersing medium for (1) comprising (a) dibutyl phthalate and (b) a liquid saturated aliphatic acetal boiling above 50° C.

5. A liquid suspension comprising (1) a dispersed phase consisting essentially of finely divided, solid, high molecular weight polychlorotrifluoroethylene and (2) a dispersing medium for (1) comprising (a) dibutyl phthalate and (b) a liquid saturated aliphatic ketone boiling above 50° C.

6. A liquid suspension comprising (1) a dispersed phase consisting essentially of finely divided, solid, high molecular weight polychlorotrifluoroethylene as the sole polymeric ingredient in the solid state and (2) a dispersing medium for (1) comprising (a) dibutyl phthalate and (b) a mixture of a liquid monohydric saturated aliphatic alcohol and a liquid dihydric saturated aliphatic alcohol, both of the aforesaid alcohols boiling above 50° C.

7. A liquid suspension comprising (1) a dispersed phase consisting essentially of finely divided, solid, high molecular weight polychlorotrifluoroethylene as the sole polymeric ingredient in the solid state and (2) a dispersing medium for (1) comprising (a) dibutyl phthalate and (b) n-butanol.

8. The method of making a stable suspension which comprises forming a mixture of ingredients comprising (1) a dispersed phase consisting essentially of finely divided, solid, high molecular weight polychlorotrifluoroethylene and (2) a dispersing medium from (1) comprising (a) an organic liquid which is a solvent for the aforesaid solid polymer at elevated temperatures but whose solvent characteristic is effective at a temperature below the boiling point of the liquid, the aforementioned liquid being selected from the class consisting of dibutyl phthalate, dibutyl sebacate, butyl stearate, dibutyl adipate, dioctyl sebacate, methyl stearate, tributyl citrate, tributyl tricarballylate, acetyl tributyl citrate, dihexyl tetrachlorophthalate, dioctyl tetrachlorophthalate, triethylene glycol di-(2-ethylhexoate), and beta-naphthyl benzoate, and (b) a non-solvent liquid oxygen-containing diluent having a boiling point above 50° C. and selected from the class consisting of saturated aliphatic ethers, saturated aliphatic monohydric alcohols, saturated aliphatic ketones, saturated aliphatic esters, mixtures of monohydric saturated aliphatic alcohols and dihydric saturated aliphatic alcohols, and mixtures of the foregoing oxygen-containing compounds, and (2) grinding the aforementioned mixture of ingredients until a stable suspension is obtained.

9. The method of making a stable suspension which comprises (1) forming a mixture of ingredients comprising (a) finely divided, solid, high molecular weight polychlorotrifluoroethylene and (b) a dispersing medium for (a) comprising (A) dibutyl phthalate and (B) a liquid saturated aliphatic monohydric alcohol boiling above 50° C., and (2) grinding the aforementioned mixture of ingredients until a stable suspension is obtained.

10. The method of making a stable suspension which comprises (1) forming a mixture of ingredients comprising (a) finely divided, solid, high molecular weight polychlorotrifluoroethylene and (b) a dispersing medium for (a) comprising (A) dibutyl phthalate and (B) a liquid saturated aliphatic ether boiling above 50° C., and (2) grinding the aforementioned mixture of ingredients until a stable suspension is obtained.

11. The method of making a stable suspension which comprises (1) forming a mixture of ingredients comprising (a) finely divided, solid, high molecular weight polychlorotrifluoroethylene and (b) a dispersing medium for (a) comprising (A) dibutyl phthalate and (B) a liquid saturated aliphatic acetal boiling above 50° C., and (2) grinding the aforementioned mixture of ingredients until a stable suspension is obtained.

12. The method of making a stable suspension which comprises (1) forming a mixture of ingredients comprising (a) finely divided, solid, high molecular weight polychlorotrifluoroethylene and (b) a dispersing medium for (a) comprising (A) dibutyl phthalate and (B) a liquid saturated aliphatic ketone boiling above 50° C., and (2) grinding the aforementioned mixture of ingredients until a stable suspension is obtained.

13. The method of making a stable suspension which comprises (1) forming a mixture of ingredients comprising (a) finely divided, solid, high molecular weight polychlorotrifluoroethylene as the sole polymeric ingredient in the solid state and (b) a dispersing medium for (a) comprising (A) dibutyl phthalate and (B) a mixture of a liquid monohydric saturated aliphatic alcohol and a liquid dihydric saturated aliphatic alcohol, both of the aforesaid alcohols boiling above 50° C., and (2) grinding the aforementioned mixture of ingredients until a stable suspension is obtained.

14. The method of making a stable suspension which comprises (1) forming a mixture of ingredients comprising (a) finely divided, solid, high molecular weight polychlorotrifluoroethylene and (b) a dispersing medium for (a) comprising (A) dibutyl phthalate and (B) n-butanol, and (2) grinding the aforementioned mixture of ingredients until a stable suspension is obtained.

MURRAY M. SPRUNG.

No references cited.